(12) United States Patent
Mistry et al.

(10) Patent No.: US 9,588,815 B1
(45) Date of Patent: Mar. 7, 2017

(54) ARCHITECTURE FOR DATA COLLECTION AND EVENT MANAGEMENT SUPPORTING AUTOMATION IN SERVICE PROVIDER CLOUD ENVIRONMENTS

(71) Applicant: EMC Corporation, Hopkinton, MA (US)

(72) Inventors: Nalinkumar Mistry, Ottawa (CA); Prasanna Patil, Scarsdale, NY (US); Jiale Huo, Kanata (CA)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 14/741,627

(22) Filed: Jun. 17, 2015

(51) Int. Cl.
*G06F 9/46* (2006.01)
*G06F 9/50* (2006.01)

(52) U.S. Cl.
CPC ............ *G06F 9/5011* (2013.01); *G06F 9/466* (2013.01); *G06F 9/505* (2013.01)

(58) Field of Classification Search
None
See application file for complete search history.

(56) References Cited

U.S. PATENT DOCUMENTS

| | | | |
|---|---|---|---|
| 6,459,682 B1 | 10/2002 | Ellesson et al. | |
| 6,556,659 B1 | 4/2003 | Bowman-Amuah | |
| 7,054,943 B1 | 5/2006 | Goldszmidt et al. | |
| 7,269,157 B2 | 9/2007 | Klinker et al. | |
| 7,356,602 B2 | 4/2008 | Goldszmidt et al. | |
| 7,653,730 B1 | 1/2010 | Hoffman et al. | |
| 7,937,453 B1 | 5/2011 | Hayden et al. | |
| 8,190,850 B1 | 5/2012 | Davenport et al. | |
| 8,291,411 B2 | 10/2012 | Beaty et al. | |
| 8,452,928 B1 | 5/2013 | Ofer et al. | |
| 2002/0083118 A1 | 6/2002 | Sim | |
| 2002/0133491 A1 | 9/2002 | Sim et al. | |
| 2003/0117954 A1 | 6/2003 | De Neve et al. | |

(Continued)

OTHER PUBLICATIONS

Lynch et al. "Implement Closed-Loop Network Decisioning Now with Big Data Analytics and Fuel Future-State SDN Use Cases Through a Common Platform Deployment.", 2014.*

(Continued)

*Primary Examiner* — Sisley Kim
(74) *Attorney, Agent, or Firm* — Ryan, Mason & Lewis, LLP (57) ABSTRACT

An apparatus comprises at least one processing platform implemented using at least one processing device comprising a processor coupled to a memory. The processing platform comprises virtualization infrastructure, an assurance layer and an analytic layer. The assurance and analytic layers are configured to provide data collection and event management functionality to support automation relating to resources of the virtualization infrastructure and associated workloads. By way of example, the assurance and analytic layers illustratively comprise respective deterministic and indeterministic functional groupings of components. The functional groupings of components of the assurance and analytic layers are utilized to implement closed-loop remediation workflows and other types of automation relating to the virtualization infrastructure resources and their associated workloads.

20 Claims, 7 Drawing Sheets

(56) References Cited

U.S. PATENT DOCUMENTS

| | | |
|---|---|---|
| 2011/0035781 A1 | 2/2011 | Moghe |
| 2011/0264663 A1 | 10/2011 | Verkasalo |
| 2012/0076052 A1 | 3/2012 | Kling et al. |
| 2013/0204849 A1 | 8/2013 | Chacko |
| 2014/0082156 A1 | 3/2014 | Jagtap |
| 2014/0101665 A1 | 4/2014 | Mousseau et al. |
| 2014/0201374 A1 | 7/2014 | Ashwood-Smith et al. |
| 2014/0241247 A1 | 8/2014 | Kempf et al. |
| 2014/0244701 A1 | 8/2014 | Welton et al. |
| 2014/0280338 A1 | 9/2014 | Metz et al. |
| 2014/0298337 A1 | 10/2014 | Anderson et al. |
| 2014/0301192 A1 | 10/2014 | Lee et al. |
| 2014/0317261 A1 | 10/2014 | Shatzkamer et al. |
| 2015/0082308 A1 | 3/2015 | Kiess et al. |
| 2015/0089331 A1 | 3/2015 | Skerry et al. |

OTHER PUBLICATIONS

European Telecommunications Standards Institute (ETSI), "Network Functions Virtualisation (NFV); Use Cases," ETSI GS NFV 001, V1.1.1, Oct. 2013, 50 pages.

European Telecommunications Standards Institute, "Network Functions Virtualisation," Introductory White Paper, presented at the SDN and OpenFlow World Congress, http://portal.etsi.org/NFV/NFV_White_Paper.pdf, Oct. 22-24, 2012, pp. 1-16, Issue 1, Darmstadt, Germany.

European Telecommunications Standards Institute, "Network Functions Virtualisation (NFV)," Update White Paper, presented at the SDN and OpenFlow World Congress, http://portal.etsi.org/NFV/NFV_White_Paper2.pdf, Oct. 15-17, 2013, pp. 1-16, Issue 1, Frankfurt, Germany.

A. Keller et al., "The WSLA Framework: Specifying and Monitoring Service Level Agreements for Web Services," Journal of Network and Systems Management, Mar. 2003, pp. 57-81, vol. 11, No. 1.

M. Mangili et al., "Stochastic Planning for Content Delivery: Unveiling the Benefits of Network Functions Virtualization," The 22nd IEEE International Conference on Network Protocols (ICNP), Oct. 2014, 6 pages.

M.K. Nichat et al., "Review on Modeling and Implementation of Cloud Computing," International Journal of Computer Science and Information Technologies (IJCSIT), Jan.-Feb. 2014, pp. 508-511, vol. 5, No. 1.

S. Aleksic et al., "Network Virtualization: Paving the Way to Carrier Clouds (invited)," 16th International Telecommunications Network Strategy and Planning Symposium (Networks), Sep. 2014, pp. 1-6, Funchal, Madeira Island, Portugal.

M. Chiosi et al., "Network Functions Virtualisation—An Introduction, Benefits, Enablers, Challenges & Call for Action," Introductory White Paper, SDN and OpenFlow World Congress, Oct. 2012, pp. 1-16, No. 1, Darmstadt, Germany.

Wikipedia, "Network Functions Virtualization," http://en.wikipedia.org/wiki/Network_Functions_Virtualization, Nov. 2014, 4 pages.

R. Jain, "OpenFlow, Software Defined Networking (SDN) and Network Function Virtualization (NFV)," Washington University in St. Louis, http://www.cse.wustl.edu/~jain/tutorials/icc14.htm, 2014, 93 pages.

"Pivotal RTI, Version 2.0, User's Guide, Rev: 04," Pivotal Software, Inc., Product Documentation, Sep. 2014, 223 pages.

"EMC Service Assurance Suite 9.3 Advances Integrated, Service-Aware Management," Enterprise Management Associates, Inc.,Jun. 2014, 3 pages.

* cited by examiner

ARCHITECTURE FOR DATA COLLECTION AND EVENT MANAGEMENT SUPPORTING AUTOMATION IN SERVICE PROVIDER CLOUD ENVIRONMENTS

FIELD

The field relates generally to information processing systems, and more particularly to information processing systems comprising virtualization infrastructure.

BACKGROUND

Information processing systems increasingly utilize reconfigurable virtual resources to meet changing end user needs in an efficient, flexible and cost-effective manner. For example, cloud computing and storage systems implemented using virtual resources have been widely adopted. More recently, network functions virtualization techniques have been proposed for use by telecommunication system and cable system service providers. Conventional aspects of such techniques are disclosed in European Telecommunications Standards Institute (ETSI), ETSI GS NFV 001, V1.1.1, "Network Functions Virtualisation (NFV): Use Cases," October 2013, which is incorporated by reference herein. See also the Introductory and Updated White Papers entitled "Network Functions Virtualisation," presented at the SDN and OpenFlow World Congress, Oct. 22-24, 2012 and Oct. 15-17, 2013, respectively, which are incorporated by reference herein. However, despite these and other recent advances in virtualization techniques, a need remains for further improvements, for example, with regard to implementation of data collection and event management functionality.

SUMMARY

Illustrative embodiments of the present invention provide architectures for data collection and event management supporting automation in service provider cloud environments and other types of systems comprising virtualization infrastructure. For example, one or more such embodiments allow particularly efficient implementation of a wide variety of solutions that leverage data collection and event management to enable automation in a service provider cloud environment.

In one embodiment, an apparatus comprises at least one processing platform implemented using at least one processing device comprising a processor coupled to a memory. The processing platform comprises virtualization infrastructure, an assurance layer and an analytic layer. The assurance and analytic layers are configured to provide data collection and event management functionality to support automation relating to resources of the virtualization infrastructure and associated workloads.

By way of example, the assurance and analytic layers illustratively comprise respective deterministic and indeterministic functional groupings of components, with the deterministic and indeterministic functional groupings being configured to implement different portions of the data collection and event management functionality.

In some embodiments, the portions of the data collection and event management functionality implemented by the deterministic functional grouping of components of the assurance layer comprise one or more of network topology determination and root cause analysis, and the portions of the data collection and event management functionality implemented by the indeterministic functional grouping of components of the analytic layer comprise one or more of real-time stream processing, real-time analytics and batch processing.

These and other illustrative embodiments described herein include, without limitation, methods, apparatus, systems, and articles of manufacture comprising processor-readable storage media.

DETAILED DESCRIPTION

Illustrative embodiments of the present invention will be described herein with reference to exemplary information processing systems and associated computers, servers, storage devices and other processing devices. It is to be appreciated, however, that embodiments of the invention are not restricted to use with the particular illustrative system and device configurations shown. Accordingly, the term "information processing system" as used herein is intended to be broadly construed, so as to encompass, for example, processing systems comprising private and public cloud computing or storage systems, as well as other types of processing systems comprising different arrangements of physical resources, logical resources, virtual resources and other types of resources.

Figure 1:
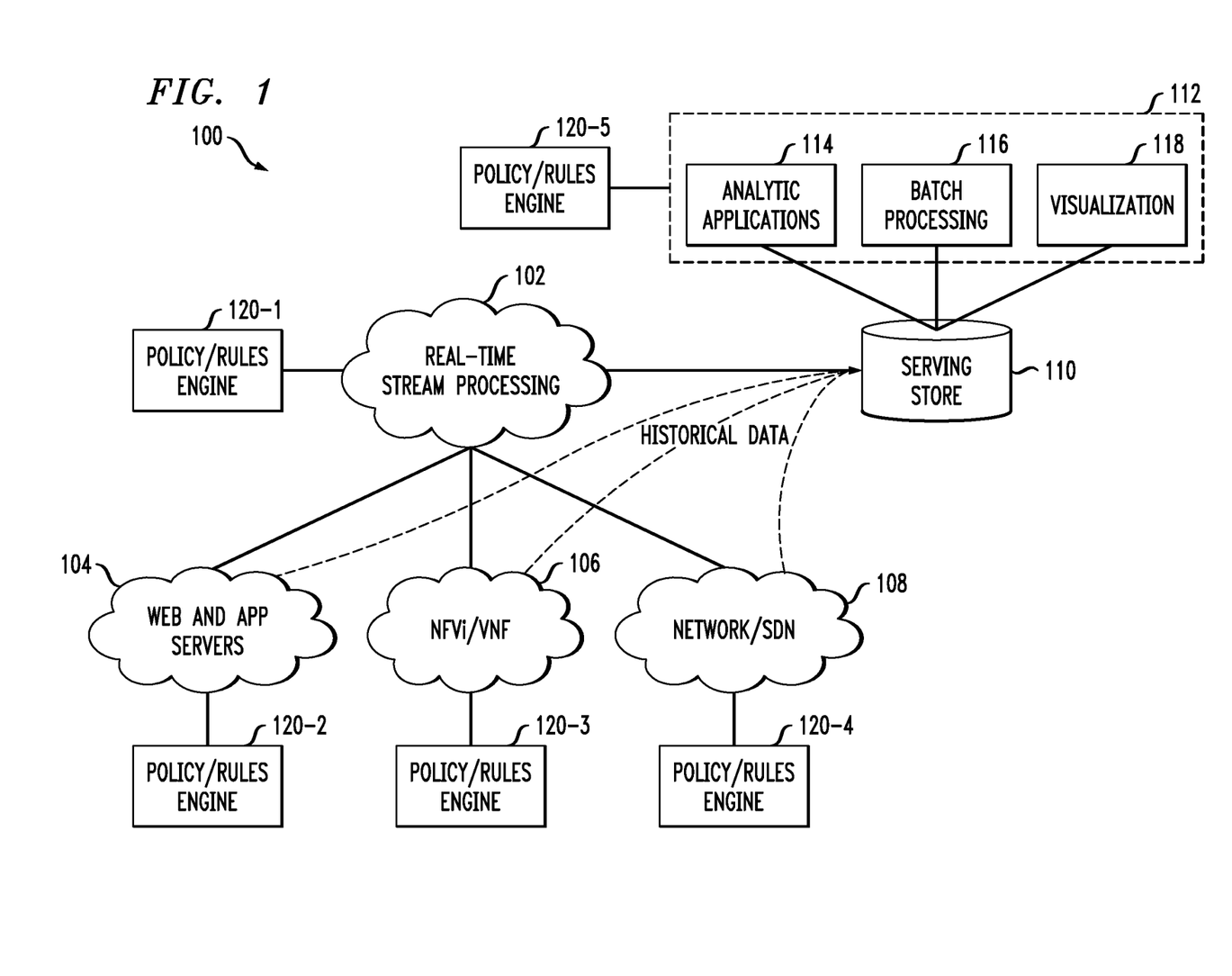
FIG. 1 is a block diagram of an information processing system comprising assurance and analytic layers configured to implement data collection and event management functionality in an illustrative embodiment.

FIG. 1 shows an information processing system 100 comprising assurance and analytic layers configured to implement data collection and event management functionality in an illustrative embodiment. The system 100 comprises real-time stream processing components 102 coupled to web application and server components 104. Also included in the system 100 are virtualization resources including network function virtualization infrastructure (NFVi) and virtual network function (VNF) resources, collectively denoted by reference numeral 106, and network/software-defined network (SDN) resources 108.

Each of the system elements 102, 104, 106 and 108 is illustratively configured to interface directly or indirectly with a serving store 110 that stores historical data relating to the functionality of the corresponding element. The serving store 110 is also accessible to additional processing components 112 including analytic applications 114, batch processing components 116 and visualization components 118. The serving store 110 and other serving stores referred to herein can in some embodiments be implemented in the form of respective data lakes.

The system 100 further comprises a plurality of policy/rules engines 120-1, 120-2, 120-3, 120-4 and 120-5, associated with respective ones of the system elements 102, 104, 106 and 108. These engines in other embodiments are collectively implemented as a single policy/rules engine accessible to each of the elements.

The virtualization infrastructure resources associated with elements 106 and 108 in the system 100 illustratively comprise compute, network and storage resources associated with one or more operator networks or other service provider networks. These resources may be utilized, for example, to implement portions of one or more networks, such as operator networks or other service provider networks. By way of example, the resources may be utilized to implement edge nodes and core nodes of the one or more networks. At least a subset of these nodes can be dynamically added to and deleted from the one or more networks in accordance with one or more policies of the policies/rules engines 120.

The system 100 is assumed to comprise an assurance layer and an analytic layer, although those layers are not explicitly illustrated in this figure. The assurance and analytic layers are configured to provide data collection and event management functionality to support automation relating to resources of the virtualization infrastructure and associated workloads within the system.

The assurance and analytic layers illustratively comprise respective deterministic and indeterministic functional groupings of components associated with at least a subset of system elements 102, 104, 106, 108, 110 and 112, with the deterministic and indeterministic functional groupings being configured to implement different portions of the data collection and event management functionality. It is to be appreciated that the terms "deterministic" and "indeterministic" as used herein are intended to be broadly construed, encompassing, for example, respective predictable and unpredictable arrangements given a set of system specifications such as particular system configuration parameters. However, other embodiments can use different functional groupings of components, such as hybrid combinations of both deterministic and indeterministic components within respective groupings.

In some embodiments, assurance and analytic layers and related system elements are configured in a cloud service provider environment to enable service offerings such as Infrastructure-as-a-Service (IaaS), Platform-as-a-Service (PaaS) and Software-as-a-Service (SaaS).

The system elements illustratively communicate with one another over one or more operator networks or other service provider networks. At least parts of one or more of such service provider networks, or other networks utilized in other embodiments, may illustratively comprise, for example, a global computer network such as the Internet, a wide area network (WAN), a local area network (LAN), a satellite network, a telephone or cable network, a cellular network, a wireless network implemented using a wireless protocol such as WiFi or WiMAX, or various portions or combinations of these and other types of communication networks.

At least portions of the information processing system 100 are implemented using one or more processing platforms, examples of which will be described in greater detail below in conjunction with FIGS. 7 and 8. A given such processing platform comprises at least one processing device comprising a processor coupled to a memory, and the processing device may be implemented at least in part utilizing one or more virtual machines, containers or other virtualization infrastructure.

It should be understood that the particular arrangement of components implemented in the system 100 as illustrated in FIG. 1 is presented by way of example only. In other embodiments, additional or alternative sets of elements or other related components may be used, and such components may exhibit alternative functionality and configurations.

For example, the components of system 100 can be dynamically reconfigured over time responsive to end user demand and other factors. The term "end user" as used herein is intended to be broadly construed so as to encompass not only customers or other human users, but also numerous other arrangements of human, hardware, software or firmware entities, as well as combinations of such entities.

An example of one possible manner in which assurance and analytic layers can be configured in the system 100 or other similar information processing system will now be described with reference to FIG. 2. In this embodiment, a set of system elements 200 comprises an assurance layer 202 and an analytic layer 204, with the assurance layer 202 being implemented utilizing primarily a deterministic grouping of components and the analytic layer 204 being implemented utilizing primarily an indeterministic grouping of components.

Figure 2:
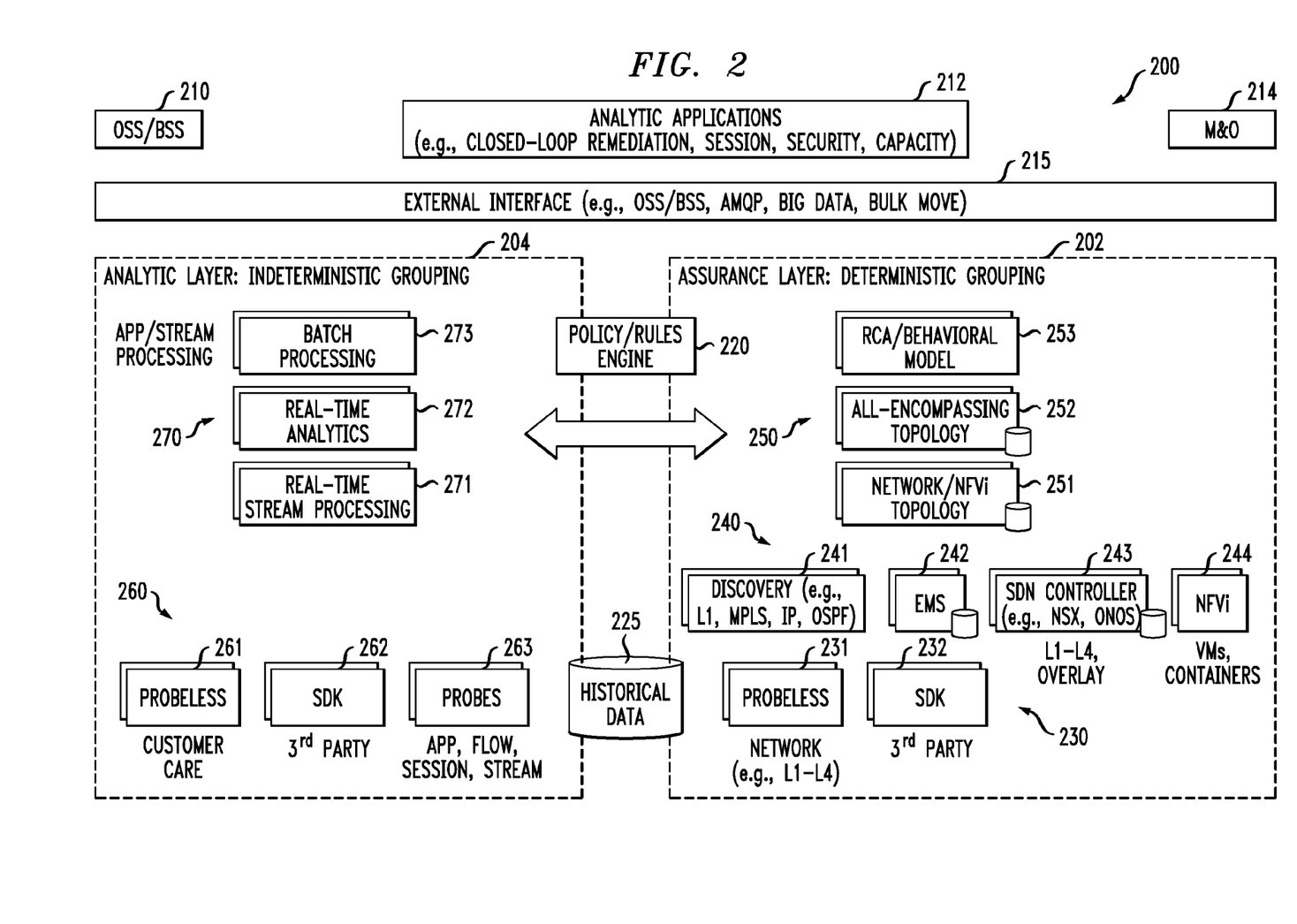
FIG. 2 illustrates an example arrangement of assurance and analytic layers that may be utilized in a system of the type shown in FIG. 1.

The term "deterministic" in the context of the FIG. 2 embodiment illustratively refers to a grouping of components that is determined in accordance with system configuration parameters, while the term "indeterministic" as used herein generally refers to a grouping of components that is not dependent on the system configuration parameters but instead varies in dependence upon actual operation of the system.

The assurance layer 202 and analytic layer 204 are configured to provide data collection and event management functionality to support automation relating to resources of the virtualization infrastructure and associated workloads. These workloads are implemented at least in part utilizing the deterministic and indeterministic groupings of components that are part of the respective assurance and analytic layers 202 and 204. As will be described in more detail below, the portions of the data collection and event management functionality implemented by the deterministic functional grouping of components of the assurance layer 202 comprise one or more of network topology determination and root cause analysis, and the portions of the data collection and event management functionality implemented by the indeterministic functional grouping of components of the analytic layer 204 comprise one or more of real-time stream processing, real-time analytics and batch processing.

The system elements 200 of the FIG. 2 embodiment further comprise, in addition to the assurance and analytic layers 202 and 204, one or more support systems 210 which comprise an operations support system (OSS) and/or a business support system (BSS), a set of analytic applications 212, at least one management and orchestration (M&O) module 214, and an external interface 215.

Examples of system functionality associated with the support systems 210 will be described in more detail below in conjunction with the illustrative embodiment of FIG. 3.

The set of analytic applications 212 illustratively includes multiple distinct applications that are implemented using components of the underlying assurance and analytic layers 202 and 204. For example, applications such as automated closed-loop remediation workflows can be supported. A more particular example of such a closed-loop remediation workflow will be described in more detail below in conjunction with FIG. 5. Other examples of applications in the set of analytic applications 212 include applications relating to one or more of session, security and capacity, as well as additional or alternative system functions.

The M&O module 214 is illustratively configured to control management and orchestration of services provided using the virtualization infrastructure. For example, the management and orchestration functions can combine or otherwise arrange particular ones of the resources to provide a particular service to an end user within the system. The term "orchestration" as used herein is intended to be broadly construed so as to encompass such arrangements as well as alternative techniques for controlling initiation of services utilizing combinations or other arrangements of selected ones of a plurality of resources. More particularly, the management and orchestration functions can be used to provision, control and manage subordinate functions that deliver particular services in the system. Such services can relate, for example, to mobile telephony services, Internet services, application services, cloud services, machine control services, etc.

The external interface 215 is configured to allow the assurance and analytic layers 202 and 204 to communicate with the OSS/BSS systems 210, the applications 212 and the M&O module 214. Accordingly, the external interface can incorporate communication functionality associated with the OSS/BSS systems 210, as well one or more messaging protocols such as advanced message queuing protocol (AMQP). Also, it can support communication functionality associated with "big data" operations performed by analytic applications 212 as well as bulk moves of data between one or more of the elements 210, 212 and 214 and the underlying assurance and analytic layers 202 and 204.

By way of example, the external interface 215 can facilitate the development of real-time continuous assurance and analytic applications that utilize the underlying assurance and analytic layers 202 and 204.

Also included in the set of system elements 200 of FIG. 2 is a policy/rules engine 220 and a serving store 225. Both of these elements illustratively span the assurance and analytic layers 202 and 204 and are utilized by components of each layer. The policy/rules engine 220 may comprise separate policy/rules engines associated with different system elements, as in the FIG. 1 embodiment. The serving store 225 illustratively stores historical data associated with the functionality of various system elements. It is also assumed to store real-time and near-real-time data, although one or more additional data stores or other types of storage devices can be used for this purpose.

As indicated previously, the serving store 225 in some embodiments can illustratively comprise a data lake. Such a data lake is assumed to be accessible to and shared by both the assurance layer 202 and the analytic layer 204 in the context of the FIG. 2 embodiment.

The assurance layer 202 in this embodiment more particularly comprises sets of components 230, 240 and 250. These components are illustratively arranged in a hierarchy with components 230 at a lowest level of the hierarchy, components 240 at an intermediate level of the hierarchy, and components 250 at higher levels of the hierarchy.

The components 230 include probeless collectors 231 configured to collect information utilizable in network topology discovery operations performed by components of higher levels. This information includes information collected from multiple network layers, including network layers denoted herein as network layers L1 to L4, illustratively in accordance with a four-layer TCP/IP network model. Other arrangements of topology information for multiple network layers can be determined in accordance with other network models, such as the seven-layer OSI model. The components 230 also include components 232 based on third-party software development kits (SDKs). The components 232 allow the assurance layer 202 to interface via well-defined APIs with third-party software products, including open source software products or after-developed software products.

The components 240 include topology discovery modules 241, element management systems (EMSs) 242, SDN controllers 243 and NFVi components 244. The topology discovery modules 241 are illustratively configured to implement various types of network topology discovery, including network layer L1 topology discovery, multi-protocol label switched (MPLS) topology discovery, Internet protocol (IP) topology discovery, OSPF topology discovery and metro Ethernet topology discovery, and possibly other types of topology discovery, for example, for other network layers. Examples of SDN controllers 243 include VMware® NSX® and open source controllers such as Open Daylight (ODL) and ONOS™ from ON.LAB. The NFVi components 244 include virtual machines (VMs), containers and other associated virtualization infrastructure.

The components 250 include components 251 configured to determine network and NFVi topology based on inputs provided by the components 240, all-encompassing topology components 252 that combine the network/NFVi topology with additional topology information such as application topology information, and additional components 253 each including a root cause analysis (RCA) component and a behavioral model associated with the RCA component. The RCA/behavioral model components 253 are utilized, for example, in implementing automation functionality such as various closed-loop remediation workflows, based on information provided by other system components.

By way of example, a given topology determination in the FIG. 2 embodiment can combine network layer L1 through L4 topology with NFVi topology as well as higher-level topology that includes applications. Such an arrangement is illustrative of what is more generally referred to herein as an "all-encompassing topology."

The RCA/behavioral model components 253 illustratively utilize such topology information to pinpoint root causes of failures and other performance problems in order to enable self-healing of the system through automation under policy control.

Some of the components of the assurance layer 202 include associated databases, such as components 242, 243, 251 and 252. One or more of these databases may comprise in-memory databases. Additional or alternative components of one or more of the assurance layer 202 and the analytic layer 204 may include such associated databases, for storing real-time, near-real-time or historical data.

The analytic layer 204 in this embodiment more particularly comprises sets of components 260 and 270. Like the components of the assurance layer, these components are also illustratively arranged in a hierarchy, with components 260 at a lowest level of the hierarchy and components 270 at higher levels of the hierarchy.

The components 260 include probeless collectors 261 configured to collect information relating to customer care, components 262 based on third-party SDKs (e.g., to support NFV VNFs), and probe-based collectors ("probes") 263. The components 262 allow the analytic layer 204 to interface via well-defined APIs with third-party software products. The probe-based collectors 263 collect information relating to applications, flows, sessions, streams and other types of processing carried out within the system. Such probes can be deployed to monitor particular types of resources, such as physical or virtual resources. Probeless collectors can rely on other types of monitoring functionality to collect information, including, for example, event detection, polling and stream monitoring. Customer care information can also be collected through analysis of web traffic, click stream data, login data and web proxy logs.

The components 270 include real-time stream processing components 271, real-time analytics components 272 and batch processing components 273. The real-time stream processing components 271 are assumed to be configured to process real-time event streams, as well as other types of streams.

The components 260 and 270 illustratively leverage one or more in-memory databases, which may comprise portions of the serving store 225. These components are configured to identify and address performance problems associated with applications, flows, sessions, streams and other processing operations of the system, based at least in part on quality of service (QoS) indicators, key performance indicators (KPIs), metric analytics and other related information characterizing the performance of the system.

In the FIG. 2 embodiment, the various components can be interconnected by one or more networks, communication fabrics or other communication media.

It should be noted that multiple distinct components in the assurance and analytic layers 202 and 204 of the FIG. 2 embodiment may be arranged in a single software module, and a collection of such modules can be combined into a single product.

For example, at least a subset of the components of a deterministic functional grouping can be incorporated into a product such as the Service Assurance Suite (SAS) or SMARTS products commercially available from EMC Corporation of Hopkinton, Mass., and at least a subset of the components of an indeterministic functional grouping can be incorporated into a product such as Real-Time Intelligence (RTI) from Pivotal Software, an EMC spin-out. Numerous additional or alternative products can be used.

The system elements 200 illustrated in FIG. 2 utilize virtualization infrastructure comprising NFVi. The resources of the virtualization infrastructure illustratively include one or more VNFs of the NFVi.

Such VNFs illustratively comprise one or more applications with each application implemented utilizing at least one of a virtual machine and a container. Such virtual machines and containers in the present embodiment are illustratively part of the NFVi.

An NFV management entity of the NFVi is configured to proactively monitor VNF applications and to adjust resources allocated to those applications in order to satisfy one or more policies. Such VNF applications can be dynamically added to, modified in and deleted from the system in accordance with one or more specified policy criteria as controlled by the policy/rules engine 220.

Also, in some embodiments, the VNF applications are hierarchically distributed to facilitate scaling of at least portions of the system. For example, scale-out and scale-up mechanisms can be provided using hierarchically-distributed edge or core nodes of one or more operator or service provider networks.

At least a subset of the edge or core nodes of an operator or service provider network can be implemented at least in part as respective virtual appliances that can be reconfigured to support different functions within the system. Such appliances can be configured to include variable amounts of compute, network and storage resources as dynamically allocated from the virtualization infrastructure of the system responsive to end user demand, geographic location and other factors. By way of example, VNF instances can be used in some embodiments to support one or more edge or core nodes as respective virtual appliances.

The particular arrangement of assurance and analytic layers 202 and 204 and other system elements as illustrated in FIG. 2 is presented by way of example only, and should not be construed as limiting in any way. Numerous other arrangements of system elements can be used in implementing embodiments of the invention.

Additional illustrative embodiments of information processing systems with assurance and analytic layers will now be described with reference to FIGS. 3, 4 and 5.

Figure 3:
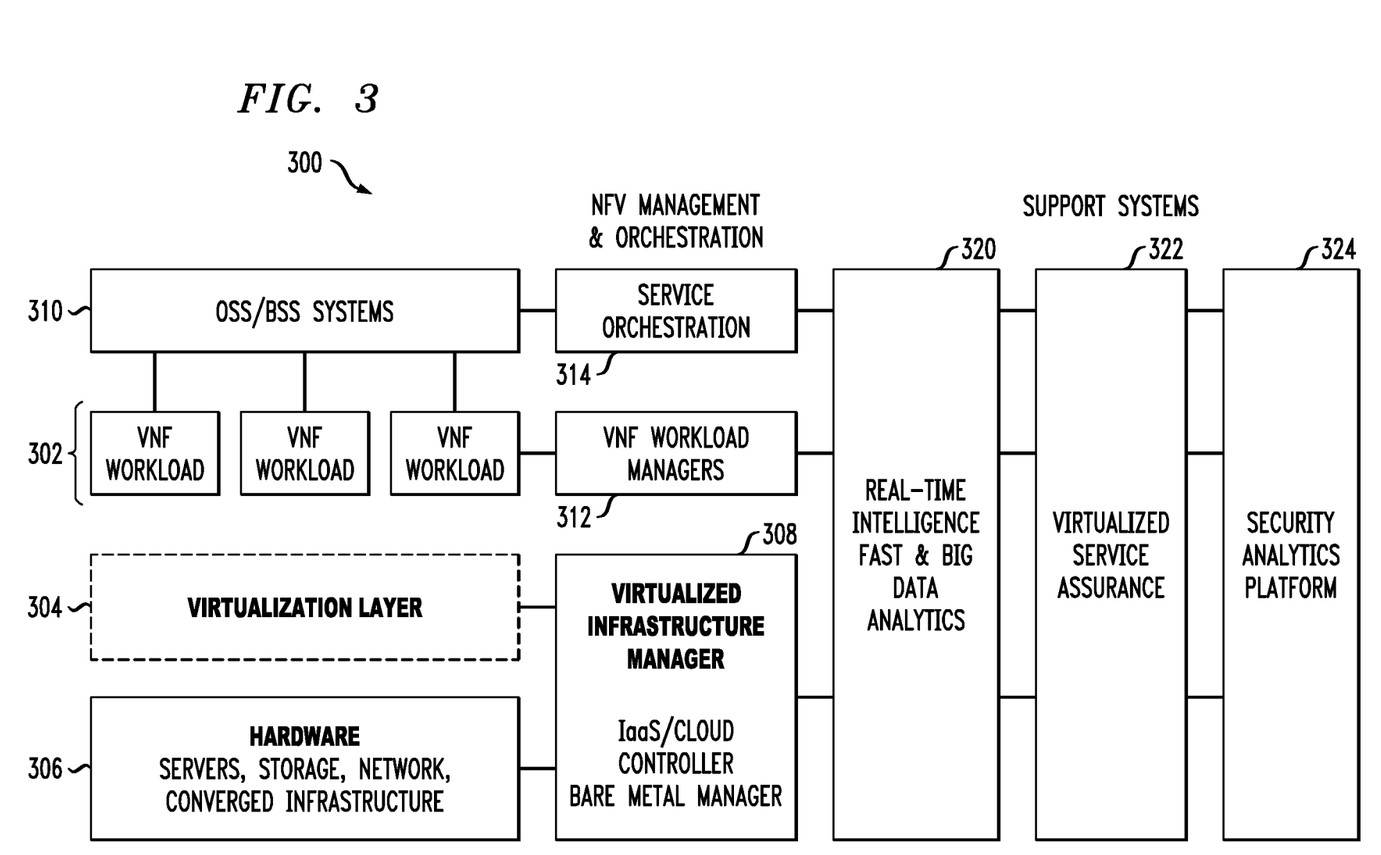
FIG. 3 shows another illustrative embodiment of an information processing system comprising assurance and analytic layers configured to implement data collection and event management functionality.

FIG. 3 shows an information processing system 300 comprising assurance and analytic layers configured to implement data collection and event management functionality. The system 300 comprises a plurality of VNF workloads 302. The VNF workloads 302 are examples of what are more generally referred to herein as "VNF instances" of an NFV framework, although other types of VNF instances can be used in other embodiments. The VNF workloads 302 are associated with a virtualization layer 304 of the system 300.

One or more of the VNF workloads 302 are each illustratively configured to provide at least a portion of the data collection and event management functionality associated with assurance and analytic layers of the system 300. The virtualization layer 304 runs on underlying hardware 306 which illustratively comprises servers, storage, network and converged infrastructure resources, under the control of a virtualized infrastructure manager 308.

The virtualized infrastructure manager 308 in this embodiment comprises an IaaS manager, a cloud controller and a so-called "bare metal" manager, where "bare metal" refers to physical infrastructure elements that do not include an operating system, and may include at least a portion of the physical infrastructure elements provided in this embodiment by hardware 306.

Figure 7:
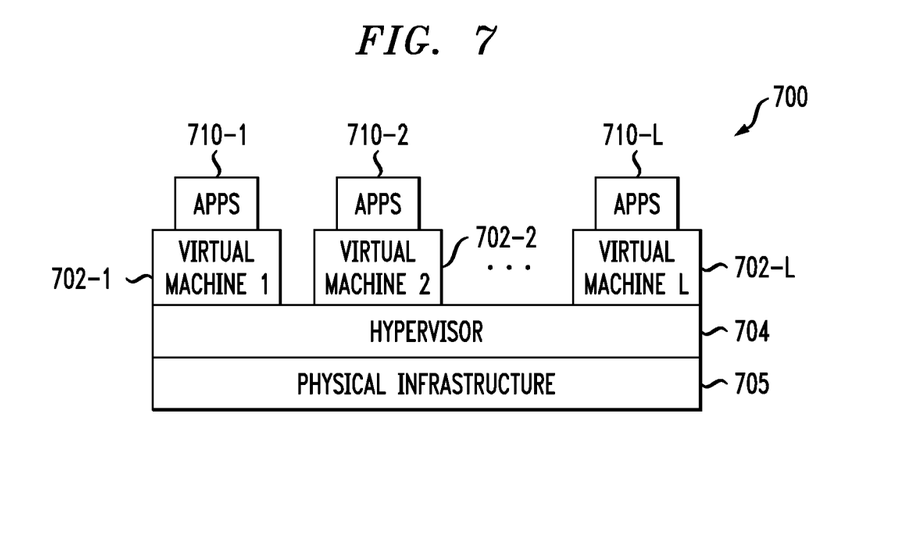
FIGS. 7 and 8 show examples of processing platforms that may be utilized to implement at least a portion of at least one of the information processing systems of FIGS. 1-3 and 5.

The VNF workloads 302, virtualization layer 304, hardware 306 and virtualized infrastructure manager 308 may be collectively viewed as one example of what is more generally referred to herein as "virtualization infrastructure." Other types of virtualization infrastructure can be used in other embodiments, including the example processing platform of FIG. 7. The VNF workloads 302 in this embodiment are assumed to comprise respective applications running inside containers of the virtualization infrastructure or on one or more virtual machines of the virtualization infrastructure.

The VNF workloads 302 are controlled at least in part by support systems 310 which comprise OSS/BSS systems, where "/" as used herein indicates "and/or" unless otherwise indicated. Additional control functionality for the VNF workloads 302 is provided by VNF workload managers 312 and service orchestration module 314.

The VNF workload managers 312 and service orchestration module 314 collectively comprise one example of what is more generally referred to herein as an NFV management entity, although in this particular embodiment more specifically denoted in the figure as an NFV management and orchestration entity.

In the FIG. 3 embodiment, distributed middleware running as one or more of the VNF workloads 302 is used to implement at least a portions of data collection and event management functionality associated with assurance and analytic layers of the system 300. Such data collection and event management functionality can be more particularly implemented, for example, utilizing one or more containers or virtual machines of the virtualization infrastructure under the control of the NFV management and orchestration entity. That entity can illustratively support add, modify and delete operations relating to the one or more containers or virtual machines utilized to implement the associated functionality.

Additional support systems associated with virtualized infrastructure manager 308, VNF workload managers 312 and service orchestration module 314 in the information processing system 300 include an analytics module 320 providing real-time intelligence for "fast data" and "big data" analytics, a virtualized service assurance module 322, and a security analytics platform 324. The additional support systems 320, 322 and 324 illustratively comprise or otherwise utilize at least portions of assurance and analytic layers of the system 300.

The NFVi supporting VNF workloads 302 in the system 300 can be used to virtualize various types of functionality previously only available using proprietary hardware. Moreover, the VNF workloads enable new services previously not available on proprietary hardware to be virtualized and deployed using pools of compute, network and storage resources of the NFVi.

The FIG. 3 embodiment may be viewed as one possible example of a service provider cloud environment, such as a telecommunication system cloud.

In some embodiments, a given system comprising assurance and analytic layers is associated with a telecommunications service provider network, and more particularly a wireless cellular network configured in accordance with the Long Term Evolution (LTE) standards of the 3G Partnership Project (3GPP). A 3GPP LTE network of this type comprises an IP-based packet core referred to as an Evolved Packet Core (EPC).

At least portions of the EPC are implemented using resources of virtualization infrastructure. Such an arrangement may be referred to as a virtual EPC (vEPC) and the corresponding resources may more particularly comprise VNF instances of NFVi. The given system can also include a plurality of base stations each implemented as an evolved Node B (eNB). The eNBs are illustratively part of an access network of the LTE network. The access network comprises, for example, an Evolved Universal Terrestrial Radio Access Network (E-UTRAN). The eNBs communicate over respective air interfaces with respective sets of user equipment (UEs).

As a more particular example, the FIG. 3 system can be configured to provide layering of virtual services and groups over the 3GPP LTE network. In such an arrangement, a group of network subscribers may be added to a virtual subscriber group. The virtual subscriber group may be serviced by a set of virtualized resources allocated to the subscriber group, where the virtualized resources are implemented using underlying physical resources. The virtualized resources may be periodically reconfigured over the underlying physical resources to ensure that the virtual subscriber group is provided with a certain level of service. Additional virtualized resources may be provisioned and allocated to serve the virtual subscriber group if the level of service is not being met.

Other embodiments can be configured using additional or alternative operator or service provider networks.

It is to be appreciated that the particular arrangement of modules and other components of the system 300 and other information processing systems described herein is illustrative only, and should not be construed as limiting in any way. Numerous alternative arrangements of modules and other components can be used in other embodiments.

Moreover, other examples of systems that can be configured to include assurance and analytic layers and associated data collection and event management functionality include cloud data centers that interface with multiple remote systems. The cloud data center in such an embodiment can include a resource pool comprising compute, network and storage resources supporting a plurality of applications.

An architecture comprising assurance and analytic layers implementing data collection and event management functionality as described in FIGS. 1-3 above allows particularly efficient implementation of a wide variety of solutions for enabling automation in a service provider cloud environment.

Figure 4:
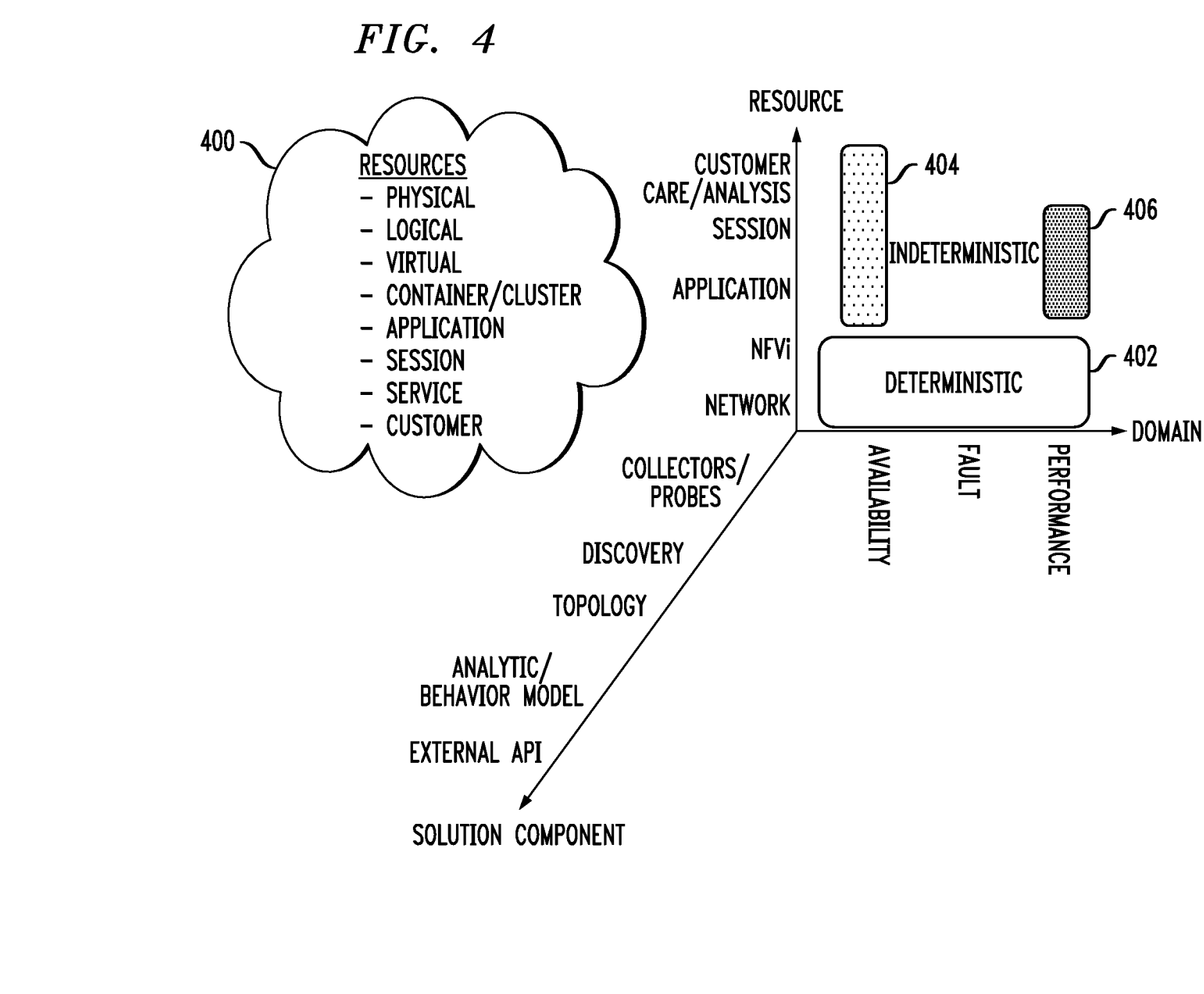
FIG. 4 is a multi-axis diagram showing examples of different possible resources, domains and solution components that may be utilized in illustrative embodiments.

One possible range of solutions is illustrated in the multi-axis diagram of FIG. 4, which shows examples of different resource, domain and solution components that may be utilized in illustrative embodiments. The solutions utilize resources 400 that illustratively include physical resources, logical resources, virtual resources, container/cluster resources, application resources, session resources, service resources and customer resources, although additional or alternative resources are possible in other embodiments. These resources are assumed at least in part to comprise resources of virtualization infrastructure and its associated workloads in a corresponding system. Various selected ones of the resources 400 are shown on a resource axis of the FIG. 4 diagram. Other axes of the FIG. 4 diagram include a domain axis and a solution component axis. The domain axis comprises availability, fault and performance domains, and the solution component axis comprises collectors/probes, discovery, topology, analytic/behavior model and external API components. It is to be understood that the particular entries on the resource, domain and solution component axes are examples only, and other entries of resources, domains and solution components may be used in other embodiments.

It can be seen from the FIG. 4 diagram that a given solution can combine multiple deterministic and indeterministic functional groupings 402, 404 and 406 of components. Such functional groupings can span multiple domains, as in the deterministic functional grouping 402 that spans the availability, fault and performance domains, or may be limited to a single domain, as in the indeterministic functional groupings 404 and 406 that are limited to the availability and performance domains, respectively. The deterministic functional grouping 402 relates to network and NFVi resources, the indeterministic functional grouping 404 relates to application, session and customer care/analysis resources, and the indeterministic functional grouping 406 relates application and session resources. For simplicity and clarity of illustration, the example functional groupings 402, 404 and 406 are not shown in three dimensions in the figure, but it should be understood that each such functional grouping can include different components from the solution component axis.

Other embodiments can include additional or alternative dimensions in the solution determination. For example, the solution determination can more generally involve N dimensions, possibly involving additional or alternative dimensions.

As is apparent from FIG. 4, different embodiments of the invention can combine different functional groupings of components to implement automated workflow solutions. These solutions illustratively utilize data collection and event management functionality provided by assurance and analytic layers of an information processing system.

An example of an automated workflow of this type will now be described with reference to FIG. 5, which shows a closed-loop remediation workflow in an illustrative embodiment utilizing data collection and event management functionality implemented by assurance and analytic layers. The closed-loop remediation workflow in this embodiment is implemented in an information processing system 500 and illustratively comprises a data source 502, a data sink 504, a stream processor 505, a batch processor 506, a behavioral model 508, an RCA component 510 and an SDN controller 515.

The behavioral model 508, RCA component 510 and SDN controller 515 are part of a deterministic functional grouping of components in an assurance layer of the system 500, and the stream and batch processors 505 and 506 are part of an indeterministic functional grouping of components in an analytic layer of the system 500. Also included in the system 500 is a policy/rules engine 520.

Figure 5:
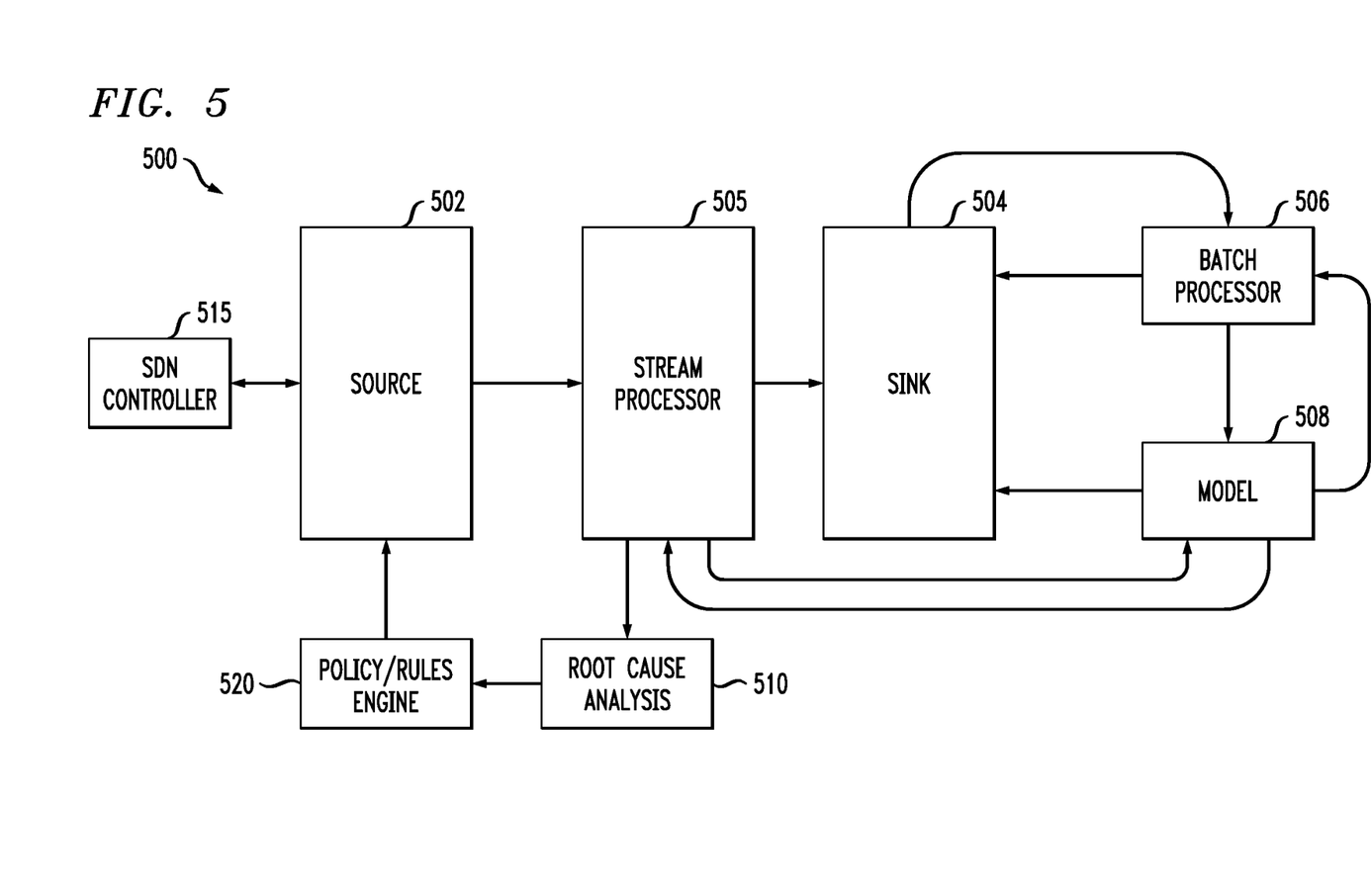
FIG. 5 shows an example of a closed-loop remediation workflow in an illustrative embodiment utilizing data collection and event management functionality implemented by assurance and analytic layers.

In the FIG. 5 embodiment, the data source 502 is controlled at least in part by SDN controller 515. The stream processor 505 receives data from the data source 502 and delivers the corresponding processed data to the data sink 504 as well as to the behavioral model 508. Data from the data sink 504 is applied to the batch processor 506, which returns batch processed data back to the data sink 504 and also provides that data to the behavioral model 508. The behavioral model 508 interacts with both the stream processor 505 and the batch processor 506, as well as with the RCA component 510.

Accordingly, data output from the stream processor 505 and the batch processor 506 are applied to the behavioral model 508 and the RCA component 510 and utilized to control operation of the data source 502 via the policy/rules engine 520.

This particular closed-loop remediation workflow utilizes both deterministic and indeterministic functional groupings of components associated with respective assurance and analytic layers of the system 500. Numerous alternative workflows or other type of automation can be implemented in a dynamic and reconfigurable manner utilizing assurance and analytic layers as disclosed herein.

Other remediation workflows or additional or alternative automations based on assurance and analytic layers can be configured using machine learning functions, or other types of learning techniques.

The operation of another illustrative embodiment of an information processing system will now be described in further detail with reference to the flow diagram of FIG. 6. The process as shown includes steps 600 through 606.

In step 600, virtualization infrastructure is provided in the information processing system. Such virtualization infrastructure illustratively comprises NFVi components such as containers and virtual machines.

In step 602, assurance and analytic layers are implemented in the system. The assurance and analytic layers are configured to provide data collection and event management functionality to support automation relating to resources of the virtualization infrastructure and associated workloads.

By way of example, the assurance layer is configured to comprise a deterministic functional grouping of components implementing first portions of the data collection and event management functionality, and the analytic layer is configured to comprise an indeterministic functional grouping of components implementing second portions of the data collection and event management functionality.

The first portions of the data collection and event management functionality implemented by the deterministic functional grouping of components of the assurance layer illustratively comprise one or more of network topology determination and root cause analysis, and the second portions of the data collection and event management functionality implemented by the indeterministic functional grouping of components of the analytic layer illustratively comprise one or more of real-time stream processing, real-time analytics and batch processing.

It is to be appreciated, however, that alternative assurance and analytic layers may be used, comprising different arrangements of components. Such components are illustratively modular in nature in order to enable suitable scale-out and scale-up mechanisms for high availability and other performance requirements.

In step 604, an interface is provided that allows one or more applications, support systems and M&O functions to access the assurance and analytic layers. An example of such an interface is the external interface 215 described in conjunction with the FIG. 2 embodiment, although other types of interfaces could be used.

In step 606, a policy/rules engine and an historical data store are provided. The policy/rules engine and historical data store span the assurance and analytic layers, and are thus accessible to and utilized by both layers. Examples of these elements include the policy/rules engines 120 and serving store 110 of the FIG. 1 embodiment, and the policy/rules engine 220 and the serving store 225 of the FIG. 2 embodiment. Additional data including real-time and near-real-time data can flow between the assurance and analytic layers, possibly through interaction with one or more in-memory databases, data lakes or other serving store arrangements. Such additional data can also be utilized in conjunction with the policy/rules engine to perform various processing operations involving the assurance and analytic layers and other system elements.

Numerous distinct automation workflows can be implemented using the system configured utilizing this example process.

For example, the assurance and analytic layers in some embodiments are illustratively configured to provide "in-life" monitoring and maintenance of the underlying resources to provide an end-to-end service to customers of a service provider.

The deterministic functional grouping of components of the assurance layer in some embodiments is focused on network topology discovery and root cause analysis relating to the virtualization infrastructure. Such an arrangement can be used to locate the root cause of a given issue from a myriad of detected events in order to identify the problem, be it availability, fault or performance related.

The indeterministic functional grouping of components of the analytic layer in some embodiments is focused on applications, be they session or stream based. These components are illustratively configured to leverage in-memory database technologies (e.g., Pivotal Gemfire) and real-time streaming technologies. Such an arrangement can identify an issue associated with an application, flow, session or stream such as a performance problem involving violation of a QoS guarantee or a KPI.

The assurance and analytic layers are configured to interact with one another. Accordingly, identification of a given issue in the analytic layer can trigger processes for determination and remediation of the root cause of the issue in the assurance layer. Identified conditions or other issues that can be addressed in this manner may relate, for example, to availability, fault, performance, security, customer experience, operational costs or combinations thereof.

A given system comprising assurance and analytic layers and other related elements as described above can support automated solutions based on data collection and event management across multiple domains, including availability, fault and performance domains as well as many others.

Figure 6:
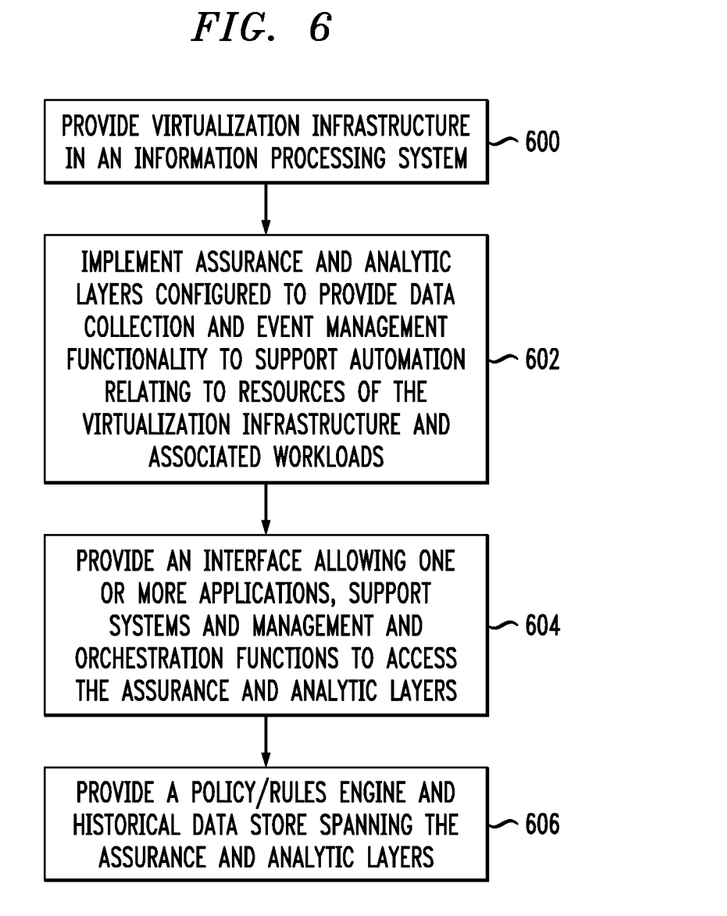
FIG. 6 is a flow diagram of an example process involving assurance and analytic layers in an illustrative embodiment.

The particular processing operations and other system functionality described in conjunction with the flow diagram of FIG. 6 are presented by way of illustrative example only, and should not be construed as limiting the scope of the invention in any way. Alternative embodiments can use other types of processing operations involving assurance and analytic layers of an information processing system. For example, the ordering of the process steps may be varied in other embodiments, or certain steps may be performed concurrently with one another rather than serially. Also, one or more of the process steps may be repeated periodically for different processing scenarios, or performed in parallel with one another. For example, parallel instantiations of one or more of the steps can be implemented through appropriate orchestration and workflows.

Functionality such as that described in conjunction with the flow diagram of FIG. 6 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

The illustrative embodiments described above provide significant advantages over conventional arrangements.

For example, embodiments of the invention facilitate implementation of closed-loop remediation workflows and other types of automation in systems comprising virtualization infrastructure. Such arrangements can, for example, allow a system to work around a given identified issue in real time and repair it later. Automation in some embodiments is illustratively based on combinations of deterministic, indeterministic and hybrid cross-domain functional groupings of components.

These embodiments can avoid limitations associated with support systems designed for particular arrangements of physical appliances. In addition, inefficiencies associated with excessive manual intervention by support system administrative staff and associated unscheduled down time are eliminated.

Illustrative embodiments are advantageously configured to apply intelligent analysis based on data collection and event management functionality implemented by assurance and analytic layers. For example, such arrangements can automatically perform root cause analysis and identify appropriate remedial measures through the use of automated workflows that permit self-healing networked systems. Accordingly, techniques disclosed herein facilitate the implementation of real-time or near real-time assurance and analytics relating to services built on virtualization infrastructure.

Some embodiments are configured to manage resources from the physical layer up through and including the application layer regardless of whether the applications are stream or session based. Assurance and analytic layers are illustratively configured to provide cross-domain management for availability, fault and performance domains as well as additional or alternative domains. Moreover, the assurance and analytic layers can process combinations of real-time, near-real-time and historical data.

Embodiments of the invention can automate issue identification and remediation in a wide variety of different contexts. Examples include issues relating to failed links or nodes, failed containers or virtual machines, or failure to meet QoS or KPI requirements for streaming applications or other services.

Embodiments of the invention can be implemented in a centralized manner, a distributed manner, or using hybrid approaches. For example, centralized deployments can involve data centers, while distributed deployments can utilize multiple points of deployment (PODs) coupled with global management. In arrangements of the latter type, PODs can be used to provide data collection and event management at a granular level, while global management provides that functionality at a coarse POD level. Functional components associated with assurance and analytic layers can be grouped and distributed as necessary to support either centralized or distributed deployment models, or hybrid combinations of such models The particular embodiments described above are examples only, and systems comprising numerous other arrangements of components can be used in other embodiments. For example, in some embodiments, only subsets of these components, or additional or alternative sets of components, may be used, and such components may exhibit alternative functionality and configurations. Accordingly, the above-described embodiments should not be construed as limiting in any way.

At least portions of a given one of the systems of FIGS. 1-3 and 5 are implemented using one or more processing platforms, examples of which will be described in greater detail below in conjunction with FIGS. 7 and 8. A given such processing platform comprises at least one processing device comprising a processor coupled to a memory, and the processing device may be implemented at least in part utilizing one or more virtual machines, containers or other virtualization infrastructure.

As shown in FIG. 7, portions of a given one of the information processing systems may comprise cloud infrastructure 700. The cloud infrastructure 700 comprises virtual machines (VMs) 702-1, 702-2, . . . 702-L implemented using a hypervisor 704. The hypervisor 704 runs on physical infrastructure 705. The cloud infrastructure 700 further comprises sets of applications 710-1, 710-2, . . . 710-L running on respective ones of the virtual machines 702-1, 702-2, . . . 702-L under the control of the hypervisor 704.

Although only a single hypervisor 704 is shown in the embodiment of FIG. 7, a given information processing system may of course include multiple hypervisors each providing a set of virtual machines using at least one underlying physical machine. Different sets of virtual machines provided by one or more hypervisors may be utilized in configuring multiple instances of various components of the system.

An example of a commercially available hypervisor platform that may be used to implement hypervisor 704 and possibly other portions of the given information processing system in one or more embodiments of the invention is the VMware® vSphere® which may have an associated virtual infrastructure management system such as the VMware® vCenter™. The underlying physical machines may comprise one or more distributed processing platforms that include storage products, such as the above-noted VNX® and Symmetrix VMAX®. A variety of other storage products may be utilized to implement at least a portion of the given information processing system.

The cloud infrastructure 700 in FIG. 7 can additionally or alternatively be implemented using other types of virtualization techniques, such as Docker containers or other types of containers referred to elsewhere herein.

Figure 8:
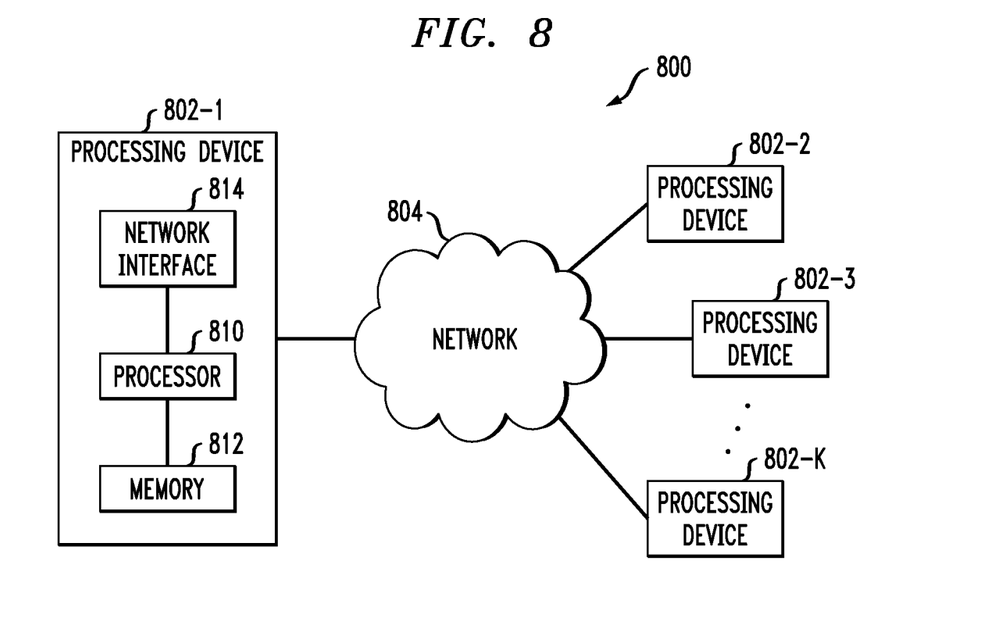

Another example of a processing platform suitable for use in some embodiments is processing platform 800 shown in FIG. 8. The processing platform 800 in this embodiment comprises at least a portion of an information processing system and includes a plurality of processing devices, denoted 802-1, 802-2, 802-3, . . . 802-K, which communicate with one another over a network 804.

The network 804 may comprise any type of network, including by way of example an operator network or other service provider network. At least parts of these or other networks utilized in embodiments of the invention may comprise, for example, a global computer network such as the Internet, a WAN, a LAN, a satellite network, a telephone or cable network, a cellular network, a wireless network such as a WiFi or WiMAX network, or various portions or combinations of these and other types of networks.

The processing device 802-1 in the processing platform 800 comprises a processor 810 coupled to a memory 812.

The processor 810 may comprise a microprocessor, a microcontroller, an application-specific integrated circuit (ASIC), a field-programmable gate array (FPGA) or other type of processing circuitry, as well as portions or combinations of such circuitry elements.

The memory 812 may comprise random access memory (RAM), read-only memory (ROM) or other types of memory, in any combination. Such memory can also include other types of storage devices, such as storage disks or storage arrays. The memory 812 and other memories disclosed herein should be viewed as illustrative examples of what is more generally referred to as a "processor-readable storage medium" storing executable program code of one or more software programs.

Articles of manufacture comprising such processor-readable storage media are considered embodiments of the present invention. A given such article of manufacture may comprise, for example, a storage device such as a storage disk, a storage array or an integrated circuit containing memory. The term "article of manufacture" as used herein should be understood to exclude transitory, propagating signals.

Also included in the processing device 802-1 is network interface circuitry 814, which is used to interface the processing device with the network 804 and other system components, and may comprise conventional transceivers.

The other processing devices 802 of the processing platform 800 are assumed to be configured in a manner similar to that shown for processing device 802-1 in the figure.

Again, the particular processing platform 800 shown in the figure is presented by way of example only, and an information processing system may include additional or alternative processing platforms, as well as numerous distinct processing platforms in any combination, with each such platform comprising one or more computers, servers, storage devices or other processing devices.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in a given information processing system. Such components can communicate with other elements of the information processing system over any type of network or other communication media.

A given information processing system as disclosed herein illustratively comprises one or more storage systems such as VNX® and Symmetrix VMAX®, both commercially available from EMC Corporation. Other types of storage elements can be used in implementing an information processing system or portions thereof, including scale-out network attached storage (NAS) clusters implemented, for example, using Isilon® storage platforms, such as storage platforms comprising Isilon® platform nodes and associated accelerators in the S-Series, X-Series and NL-Series product lines, also commercially available from EMC Corporation. A wide variety of other storage products can be used to implement at least portions of an information processing system as disclosed herein.

As indicated previously, assurance and analytic layers and other elements of an information processing system as disclosed herein can be implemented at least in part in the form of one or more software programs stored in memory and executed by a processor of a processing device such as one of the virtual machines 702 or one of the processing devices 802. For example, at least portions of one or more of the deterministic or indeterministic groupings of components in one or more of the embodiments described herein are illustratively implemented at least in part in the form of software.

It should again be emphasized that the above-described embodiments of the invention are presented for purposes of illustration only. Many variations and other alternative embodiments may be used. For example, the disclosed techniques are applicable to a wide variety of other types of information processing systems and processing devices. Also, the particular configurations of system and device elements shown in FIGS. 1-3, 5, 7 and 8 can be varied in other embodiments. Thus, for example, the particular types and arrangements of assurance and analytic layers and their respective functional groupings of components and other system elements deployed in a given embodiment and their respective configurations may be varied. Moreover, the various assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:
1. An apparatus comprising:
at least one processing platform comprising:
virtualization infrastructure;
an assurance layer comprising a first grouping of components, wherein the first grouping of components comprises a deterministic functional grouping of compo- nents determined in accordance with system configuration parameters; and an analytic layer comprising a second grouping of components, wherein the second grouping of components comprises an indeterministic functional grouping of components that is independent of the system configuration parameters;

wherein the assurance and analytic layers are configured to provide data collection and event management functionality to support automation relating to resources of the virtualization infrastructure and associated workloads;

wherein the deterministic functional grouping of components is configured to implement first portions of the data collection and event management functionality;

wherein the indeterministic functional grouping of components is configured to implement second portions of the data collection and event management functionality;

wherein the deterministic functional grouping of components of the assurance layer is arranged in a hierarchy of components comprising at least the following levels:
 a lower level comprising a collector component and a component based on a third-party software development kit;
 an intermediate level comprising a topology discovery module, an element management system, a software-defined network controller, and a network function virtualization infrastructure component; and
 a higher level comprising a network functions virtualization infrastructure topology component, an encompassing topology component, and a root cause analysis module having an associated behavioral model; and wherein the processing platform is implemented using at least one processing device comprising a processor coupled to a memory.

2. The apparatus of claim 1 wherein the first portions of the data collection and event management functionality comprise one or more of network topology determination and root cause analysis.

3. The apparatus of claim 2 wherein the network topology determination encompasses topologies of respective multiple network layers and further encompasses network function virtualization infrastructure topology.

4. The apparatus of claim 2 wherein the network topology determination is utilized in conjunction with an application topology.

5. The apparatus of claim 2 wherein the root cause analysis is utilized in implementing automation comprising a closed-loop remediation workflow based at least in part on at least one behavioral model.

6. The apparatus of claim 1 wherein the second portions of the data collection and event management functionality comprise one or more of real-time stream processing, real-time analytics and batch processing.

7. The apparatus of claim 6 wherein one or more of the components of the indeterministic functional grouping are configured to leverage an in-memory database.

8. The apparatus of claim 6 wherein one or more of the components of the indeterministic functional grouping are configured to identify and address performance problems associated with at least one of an application, a flow, a session and a stream based at least in part on one or more of quality of service indicators and key performance indicators.

9. The apparatus of claim 1 wherein the automation comprises a closed-loop remediation workflow.

10. The apparatus of claim 9 wherein the closed-loop remediation workflow comprises:
 a data source;
 a data sink; and
 a policy/rules engine;
 the deterministic functional grouping of components comprising at least one of a topology discovery module, an element management system, a software-defined network controller, a root cause analysis component and a behavioral model associated with the root cause analysis component;
 the indeterministic functional grouping of components comprising a stream processor and a batch processor;
 wherein each of the stream processor and the batch processor receives data from at least one of the data source and the data sink; and
 wherein outputs of the stream processor and batch processor are applied to the behavioral model and the root cause analysis component and utilized to control operation of the data source via the policy/rules engine.

11. The apparatus of claim 1 further comprising an external interface through which the assurance and analytic layers communicate with at least one of an application, a support system and a management and orchestration module.

12. The apparatus of claim 1 wherein the virtualization infrastructure comprises network functions virtualization infrastructure and the resources of the virtualization infrastructure comprise one or more virtual network functions of the network functions virtualization infrastructure.

13. An information processing system comprising the apparatus of claim 1.

14. The apparatus of claim 1 wherein the indeterministic grouping of components varies in dependence upon actual system operation.

15. The apparatus of claim 1 wherein the collector component is configured to collect information utilizable in one or more network topology discovery operations performed by components at the intermediate level of the hierarchy.

16. A method comprising:
 providing virtualization infrastructure; and
 implementing assurance and analytic layers configured to provide data collection and event management functionality to support automation relating to resources of the virtualization infrastructure and associated workloads;
 wherein implementing the assurance and analytic layers further comprises:
 configuring the assurance layer to comprise a first grouping of components, wherein the first grouping of components comprises a deterministic functional grouping of components determined in accordance with system configuration parameters, and wherein the deterministic functional grouping of components is configured to implement first portions of the data collection and event management functionality; and
 configuring the analytic layer to comprise a second grouping of components, wherein the second grouping of components comprises an indeterministic functional grouping of components that is independent of the system configuration parameters, and wherein the indeterministic functional grouping of components is configured to implement second portions of the data collection and event management functionality;
 wherein the deterministic functional grouping of components of the assurance layer is arranged in a hierarchy of components comprising at least the following levels:

a lower level comprising a collector component and a component based on a third-party software development kit;

an intermediate level comprising a topology discovery module, an element management system, a software-defined network controller, and a network function virtualization infrastructure component; and a higher level comprising a network functions virtualization infrastructure topology component, an encompassing topology component, and a root cause analysis module having an associated behavioral model; and wherein the providing and implementing are performed using at least one processing device comprising a processor coupled to a memory.

17. The method of claim 16 wherein the first portions of the data collection and event management functionality comprise one or more of network topology determination and root cause analysis; and wherein the second portions of the data collection and event management functionality comprise one or more of real-time stream processing, real-time analytics and batch processing.

18. The method of claim 16 wherein the collector component is configured to collect information utilizable in one or more network topology discovery operations performed by components at the intermediate level of the hierarchy.

19. A non-transitory processor-readable storage medium having stored therein program code of one or more software programs, wherein the program code when executed by at least one processing device causes said processing device:

to provide virtualization infrastructure; and to implement assurance and analytic layers configured to provide data collection and event management functionality to support automation relating to resources of the virtualization infrastructure and associated workloads;

wherein the assurance layer comprises a first grouping of components, the first grouping of components comprising a deterministic functional grouping of components determined in accordance with system configuration parameters, and wherein the deterministic functional grouping of components is configured to implement first portions of the data collection and event management functionality; and wherein the assurance layer comprises a second grouping of components, the second grouping of components comprising an indeterministic functional grouping of components that is independent of the system configuration parameters, and wherein the indeterministic functional grouping of components is configured to implement second portions of the data collection and event management functionality; and wherein the deterministic functional grouping of components of the assurance layer is arranged in a hierarchy of components comprising at least the following levels:

a lower level comprising a collector component and a component based on a third-party software development kit;

an intermediate level comprising a topology discovery module, an element management system, a software-defined network controller, and a network function virtualization infrastructure component; and a higher level comprising a network functions virtualization infrastructure topology component, an encompassing topology component, and a root cause analysis module having an associated behavioral model.

20. The non-transitory processor-readable storage medium of claim 19 wherein the storage medium comprises at least one of an electronic memory and a storage disk.

* * * * *